United States Patent
Teplitsky et al.

(10) Patent No.: US 9,419,829 B2
(45) Date of Patent: Aug. 16, 2016

(54) APPARATUS, SYSTEM AND METHOD OF DIRECT CURRENT (DC) ESTIMATION OF A WIRELESS COMMUNICATION PACKET

(71) Applicant: Intel Corporation, Santa Clara, CA (US)

(72) Inventors: Moshe Teplitsky, Tel-Aviv (IL); Michael Genossar, Modiin (IL); Elan Banin, Raanana (IL)

(73) Assignee: INTEL CORPORATION, Santa Clara, CA (US)

( * ) Notice: Subject to any disclaimer, the term of this patent is extended or adjusted under 35 U.S.C. 154(b) by 746 days.

(21) Appl. No.: 13/669,587

(22) Filed: Nov. 6, 2012

(65) Prior Publication Data
US 2014/0126390 A1 May 8, 2014

(51) Int. Cl.
*H04L 25/06* (2006.01)
(52) U.S. Cl.
CPC ............ *H04L 25/062* (2013.01); *H04L 25/065* (2013.01)
(58) Field of Classification Search
CPC ............... H04L 25/06–25/069; H04W 74/002; H04W 80/02; H04B 7/01; H04B 17/104
See application file for complete search history.

(56) References Cited

U.S. PATENT DOCUMENTS

| | | | |
|---|---|---|---|
| 2004/0032919 A1* | 2/2004 | Loan et al. | 375/346 |
| 2004/0264432 A1* | 12/2004 | Hori et al. | 370/343 |
| 2007/0190957 A1 | 8/2007 | Filipovic | |
| 2009/0285334 A1 | 11/2009 | Birkett et al. | |
| 2010/0309958 A1* | 12/2010 | Lakkis | 375/146 |
| 2010/0316175 A1 | 12/2010 | Zeng et al. | |
| 2011/0122852 A1 | 5/2011 | Yu et al. | |

FOREIGN PATENT DOCUMENTS

KR 100270310 10/2000

OTHER PUBLICATIONS

International Search Report and Written Opinion for PCT Application No. PCT/US2013/047210, mailed on Oct. 15, 2013, 14 pages.
Wireless-Gigabit-Alliance (WGA) specifications (Wireless Gigabit Alliance, Inc WiGig MAC and PHY Specification Version 1.0, Final specification), Apr. 2010.

(Continued)

*Primary Examiner* — Un C Cho
*Assistant Examiner* — Jeremy Costin
(74) *Attorney, Agent, or Firm* — Shichrur & Co.

(57) ABSTRACT

Some demonstrative embodiments include devices, systems and/or methods of Direct Current (DC) estimation. For example, an apparatus may include an estimator to estimate a DC component of a received wireless communication packet based on a first value, a second value and an estimated frequency offset, wherein the first value is based on a first plurality of samples including at least a plurality of samples of a first sequence of a preamble of the wireless communication packet, the second value is based on a second plurality of samples including at least a plurality of samples of a second sequence of the preamble, immediately successive to the first sequence, and the estimated frequency offset corresponds to a frequency offset between the first and second pluralities of samples.

26 Claims, 6 Drawing Sheets

(56) References Cited

OTHER PUBLICATIONS

IEEE Std 802.11™-2012. Part 11: Wireless LAN Medium Access Control (MAC) and Physical Layer (PHY) Specifications, IEEE Standard for Information technology. Telecommunications and information exchange between systems Local and metropolitan area networks-Specific requirements, Mar. 29, 2012.

International Preliminary Report on Patentability and Written Opinion for International Patent Application No. PCT/US2013/047210, mailed on May 21, 2015, 8 pages.

* cited by examiner

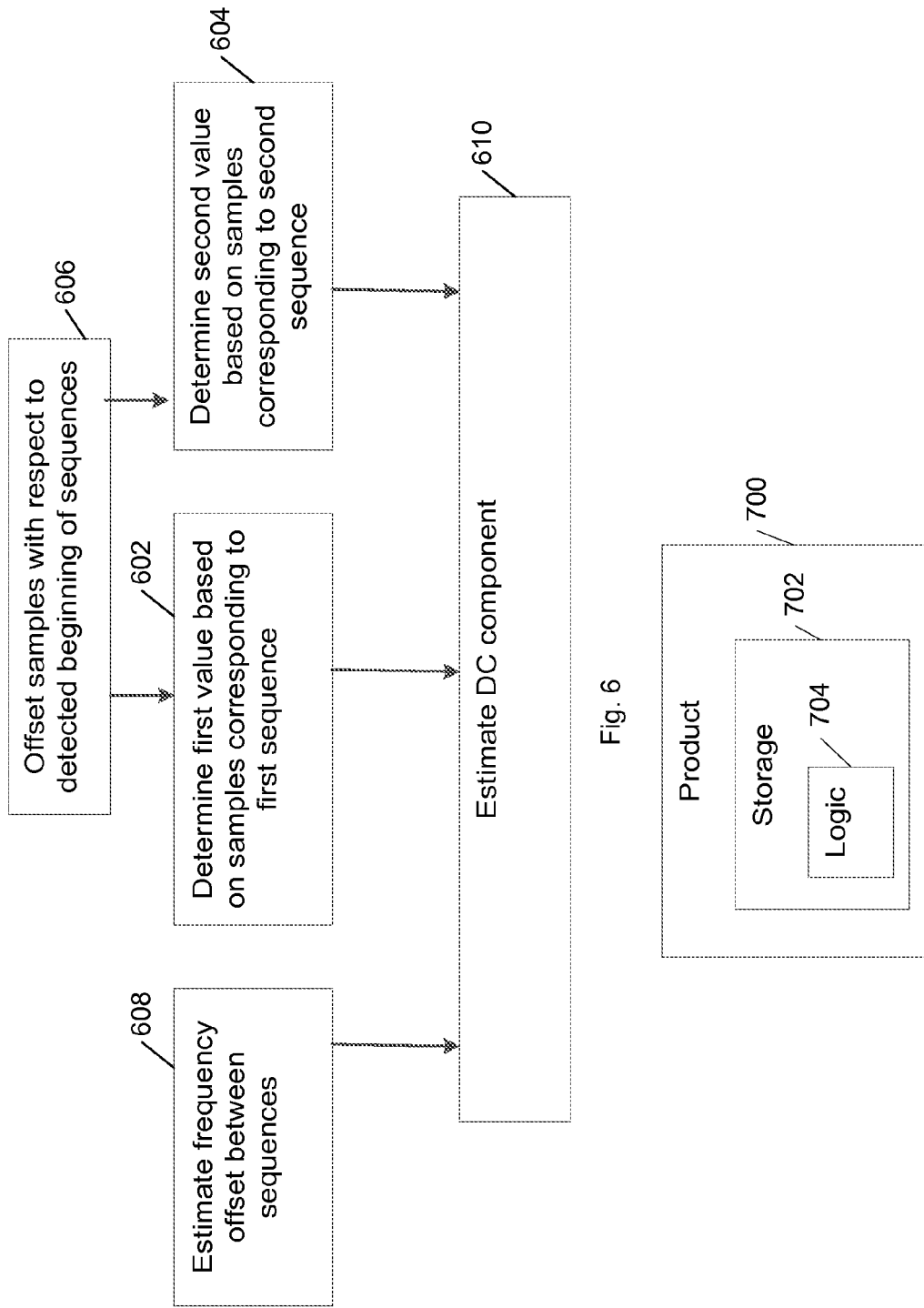

APPARATUS, SYSTEM AND METHOD OF DIRECT CURRENT (DC) ESTIMATION OF A WIRELESS COMMUNICATION PACKET

BACKGROUND

A received wireless communication signal may suffer Direct Current (DC) impairment. The DC impairment may vary based on various parameters, e.g., gain, temperature and the like.

Mitigation of a DC component of a received signal at a relatively high accuracy level may be required, for example, when communicating at relatively high Signal-to-Noise-Ratio (SNR) levels.

One method of mitigating the DC component may include using a notch filter. For example, a High Pass Filter (HPF) may be utilized. However, the HPF may also affect other components of the signal, e.g., by reducing a gain of the components. For example, applying the HPF to a Short training Field (STF) of a preamble of a wireless communication packet may result in degradation of a Channel Estimation (CE) field of the preamble.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 6 is a schematic flow-chart illustration of a method of DC estimation, in accordance with some demonstrative embodiments.

FIG. 7 is a schematic illustration of a product, in accordance with some demonstrative embodiments.

DETAILED DESCRIPTION

Figure 1:
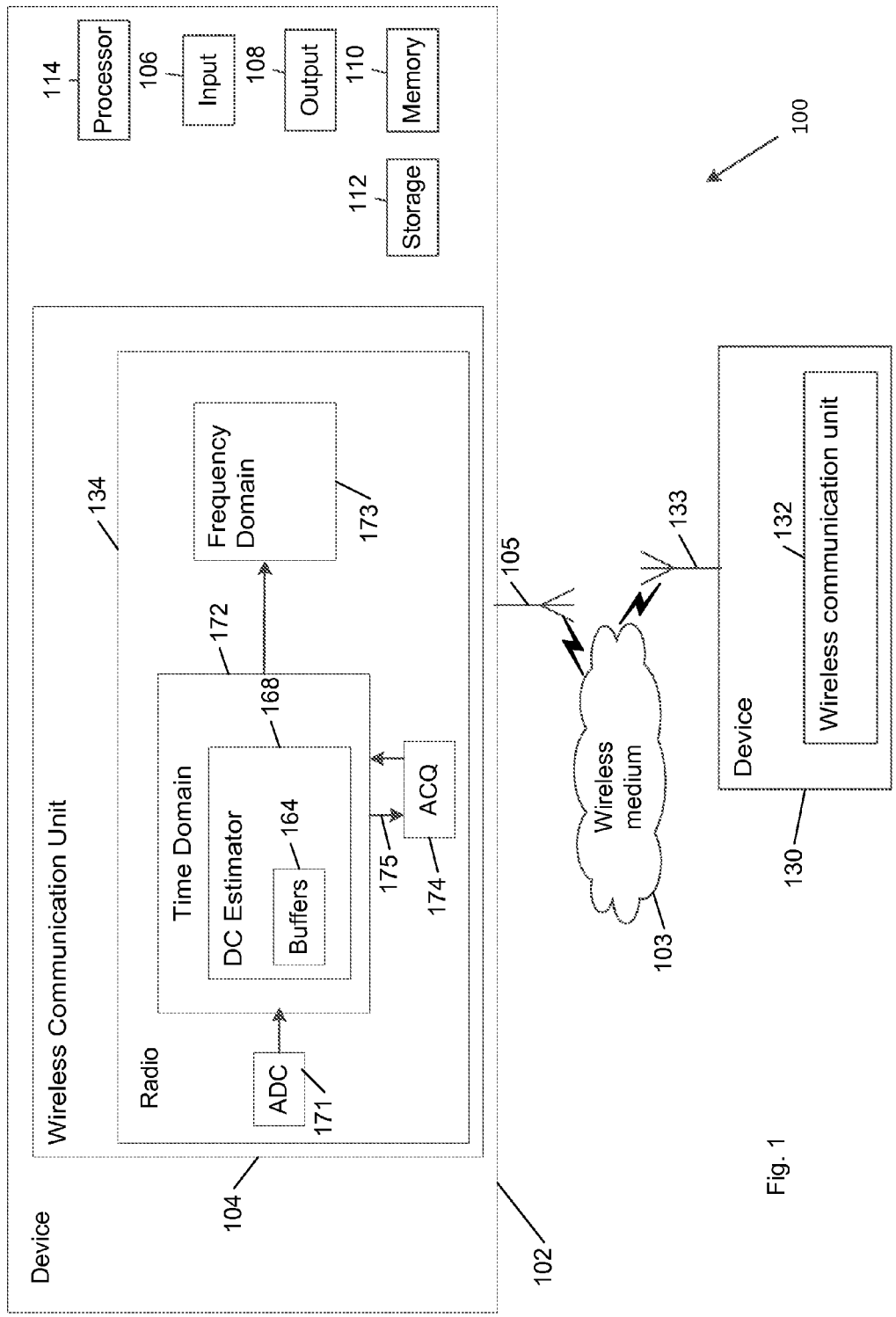
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (Wireless Gigabit Alliance, Inc WiGig MAC and PHY Specification Version 1.0, April 2010, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar.* 29, 2102; IEEE802.11 task group ac (TGac) (*"IEEE802.11-09/0308r12—TGac Channel Model Addendum Document"*); IEEE 802.11 *task group ad (TGad)* (*IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band*), and/or future versions and/or derivatives thereof, devices and/or networks operating in accordance with existing IEEE 802.16 standards (*IEEE-Std 802.16, 2009 Edition, Air Interface for Fixed Broadband*

Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless— WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/ or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 102 and/or 130, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 130 may include, for example, a PC, a desktop computer, a mobile computer, a laptop computer, a notebook computer, a tablet computer, a server computer, a media center, a mobile internet device, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102 and/or 130 may include wireless communication units 104 and/or 132, respectively, to perform wireless communication between wireless communication devices 102 and 130 and/or with one or more other wireless communication devices, e.g., as described below.

Wireless communication devices 102 and/or 130 may also include, for example, one or more of a processor 114, an input unit 106, an output unit 108, a memory unit 110, and a storage unit 112. Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-screen, a touch-pad, a track-ball, a stylus, a microphone, or other suitable pointing device or input device. Output unit 108 includes, for example, a monitor, a screen, a touch-screen, a flat panel display, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and 132 may include, or may be associated with, one or more antennas 105 and 133, respectively. Antennas 105 and/or 133 may include any type of antennas suitable for transmitting and/or receiving wireless communication signals, blocks, frames, transmission streams, packets, messages and/or data. For example, antennas 105 and/or 133 may include any suitable configuration, structure and/or arrangement of one or more antenna elements, components, units, assemblies and/or arrays. Antennas 105 and/or 133 may include, for example, antennas suitable for directional communication, e.g., using beamforming techniques. For example, antennas 105 and/or 133 may include a phased array antenna, a single element antenna, a set of switched beam antennas, and/or the like. In some embodiments, antennas 105 and/or 133 may implement transmit and receive functionalities using separate transmit and receive antenna elements. In some embodiments, antennas 105 and/or 133 may implement transmit and receive functionalities using common and/or integrated transmit/receive elements.

In some demonstrative embodiments, wireless communication units 104 and/or 132 include, for example, one or more radios 134, e.g., including one or more wireless transmitters, receivers and/or transceivers able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

In some demonstrative embodiments, wireless communication devices 102 and/or 130 may perform the functionality of DMG stations ("DMG STA"). For example, wireless communication devices 102 and/or 130 may be configured to communicate over the DMG band.

In some demonstrative embodiments, device 102 may include a Direct Current (DC) estimator 168 to estimate a DC component of a wireless communication packet received by device 102.

In some demonstrative embodiments, wireless communication unit 104 may be configured according to an initial DC calibration, e.g., during manufacturing. A DC impairment of wireless communication unit 104 may vary according to various conditions and/or parameters, e.g., gain, temperature, and the like.

In some demonstrative embodiments, DC estimator 168 may be configured to dynamically estimate and/or calibrate the DC impairment of wireless communication unit 104. For example, DC estimator 168 may estimate and/or calibrate the DC impairment of wireless communication unit 104 based on preambles of wireless communication packets received by device 102.

In one example, DC estimator 168 may estimate and/or calibrate the DC impairment of wireless communication unit 104 by estimating the DC component of the preambles, e.g., periodically.

In some demonstrative, DC estimator 168 may be implemented as part of wireless communication unit 104, e.g., as part of radio 134, to estimate the DC component of a wireless communication packet received by wireless communication unit 104, e.g., from wireless communication unit 132. In other embodiments, DC estimator 168 may be implemented as part of any other element of device 102.

In some demonstrative embodiments, radio 134 may include an Analog to Digital Converter (ADC) 171 to convert analog signals of a received wireless communication packet into digital samples to be processed in a time domain 172.

In some demonstrative embodiments, DC estimator 168 may be implemented, for example, to estimate the DC component in time domain 172.

In some demonstrative embodiments, radio 134 may also include an Acquisition (ACQ) unit 174 configured to detect a plurality of sequences of a preamble of the wireless communication packet and to estimate a frequency offset between the sequences, e.g., based on samples 175 received from time domain 172.

In some demonstrative embodiments, time domain 172 may provide calibrated signals, e.g., DC and/or offset calibrated signals, to be processed by a frequency domain 173.

In some demonstrative embodiments, DC estimator 168 may be configured to estimate a DC component of the received wireless communication packet based on the samples of the preamble of the wireless communication packet, e.g., based on the samples provided by ADC 171.

In some demonstrative embodiments, DC estimator 168 may estimate the DC component based on a first value corresponding to at least a first sequence of the preamble, and a second value corresponding to at least a second sequence of the preamble, e.g., as described in detail below.

In some demonstrative embodiments, the first value may based on a first plurality of samples including at least a plurality of samples of the first sequence, and/or the second value may be based on a second plurality of samples including at least a plurality of samples of the second sequence. The second sequence may be immediately successive to the first sequence.

In some demonstrative embodiments, DC estimator 168 may estimate the DC component based on the first and second values and an estimated frequency offset corresponding to a frequency offset between the first and second pluralities of samples, as described in detail below. For example, DC estimator 168 may receive the frequency offset from ACQ unit 174, e.g., as described below.

In some demonstrative embodiments, DC estimator 168 may estimate the DC component based on a predefined section of the preamble, which has an average zero mean value, e.g., as described in detail below.

In some demonstrative embodiments, the first sequence may include a second to last sequence of a Short training Field (STF) of the preamble, and the second sequence may include a last sequence of the STF field, e.g., as described in detail below.

Some demonstrative embodiments are described below with reference to DC estimation based on a section of a preamble including a first sequence, e.g., the Golay sequence $Ga_{128}$, followed by a second sequence, e.g., the Golay sequence $-GA_{128}$, which is an inverse of the first sequence. However, in other embodiments, the DC estimation may be performed with respect to any other section, e.g., any other section of the wireless communication packet, any section of the preamble of the packet and/or any other section of the STF, including any other Golay sequences and/or any other one or more sequences having an average mean value.

Figure 2:
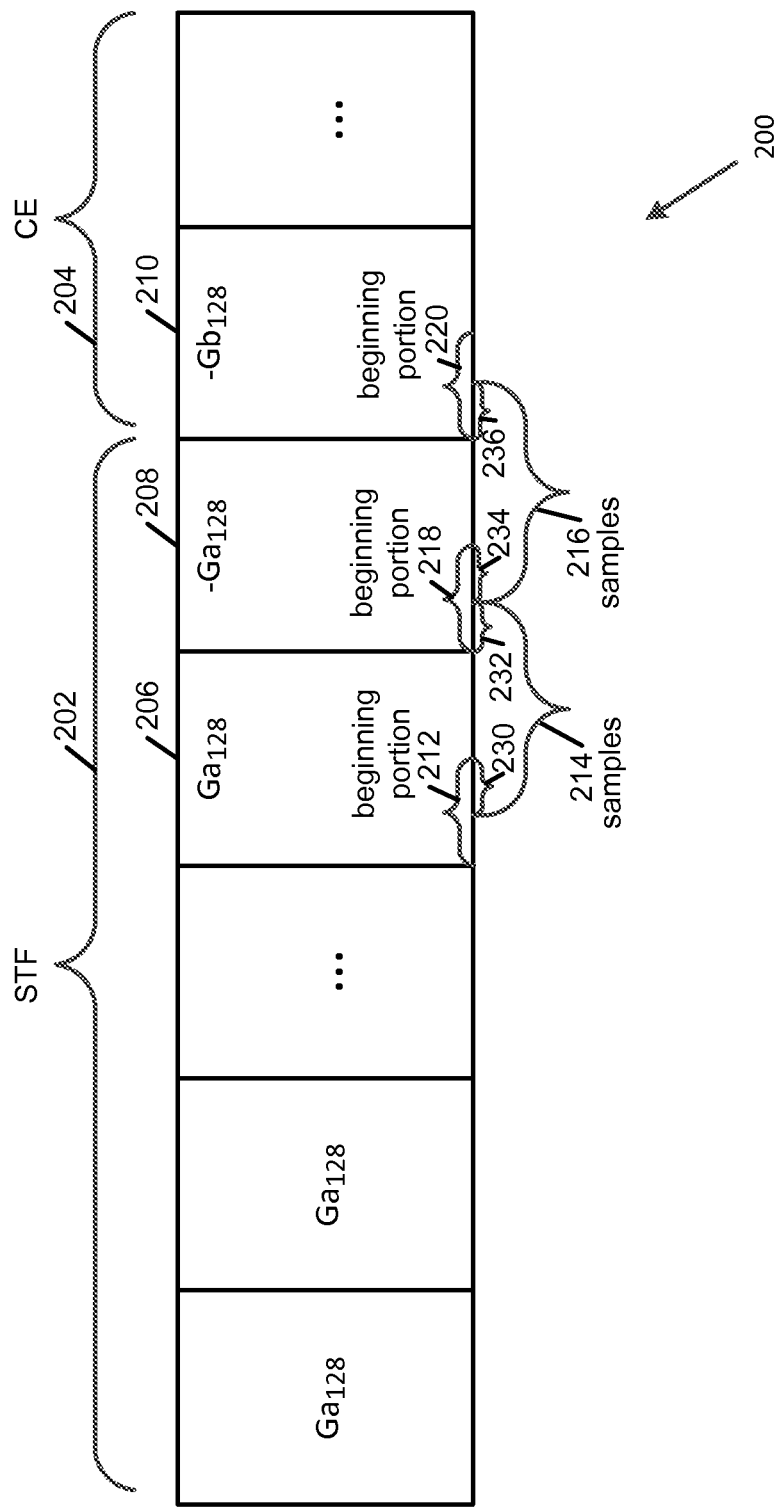
FIG. 2 is a schematic illustration of a preamble of a wireless communication packet, in accordance with some demonstrative embodiments.

Reference is made to FIG. 2, which schematically illustrates a preamble 200 of a wireless communication packet, in accordance with some demonstrative embodiments. For example, wireless communication unit 104 (FIG. 1) may receive the wireless communication packet including preamble 200, and DC estimator 168 (FIG. 1) may estimate the DC component of the wireless communication packet based on preamble 200.

A shown in FIG. 2, preamble 200 may include a STF 202 followed by a Channel Estimation (CE) field 204.

As shown in FIG. 2, STF 202 may include a plurality of Golay sequences. For example, STF 202 may include a repetition of a first Golay sequence followed by a second Golay sequence, which is an inverse of the first Golay sequence. In one example, as shown in FIG. 2, STF 202 may include a repetition of the Golay sequence $Ga_{128}$ followed by the Golay sequence $-Ga_{128}$, e.g., such that a second to last sequence 206 of STF 202 includes the Golay sequence $Ga_{128}$, and a last sequence 208 of the STF 202 includes the Golay sequence $-Ga_{128}$.

As shown in FIG. 2, CE field 204 may begin with a sequence 210, which may be immediately successive to sequence 208. For example, sequence 210 may include the Golay sequence $-Gb_{128}$.

In some demonstrative embodiments, a beginning portion 220 of sequence 210 may include a plurality of values, which are an inverse, of a respective plurality of values included in a first portion 218 of sequence 208. For example, by definition, a plurality of values at the beginning of the Golay sequence $-Gb_{128}$ may be an inverse of a respective plurality of values at the beginning of the Golay sequence $-Ga_{128}$.

In some demonstrative embodiments, the plurality of values of portion 220 may be identical to a respective plurality of values of a beginning portion 212 of sequence 206. For example, by definition, the plurality of values at the beginning of the Golay sequence $-Gb_{128}$ may be identical to a respective plurality of values at the beginning of the Golay sequence $Ga_{128}$.

In one example, sequences 206, 208 and 210 may each include 128 values, and portions 212, 218 and 220 may include the first 64 values of sequences 206, 208 and 210, respectively. In other embodiments, sequences 206, 208 and 210 and/or portions 212, 218 and 220 may include any other number of values.

Referring back to FIG. 1, in some demonstrative embodiments DC estimator 168 may estimate the DC component based on the first plurality of samples including at least a plurality of samples of sequence 206 (FIG. 2), the second plurality of samples including at least a plurality of samples of sequence 208 (FIG. 2), and an estimated frequency offset corresponding to a frequency offset between the first and second pluralities of samples, as described in detail below.

In some demonstrative embodiments, DC estimator 168 may estimate the DC component based on samples corresponding to a section of STF 202 (FIG. 2) including sequences 206 (FIG. 2) and 208 (FIG. 2), which may have an average zero-mean value, e.g., since sequence 208 (FIG. 2) is an inverse of sequence 206 (FIG. 2).

In some demonstrative embodiments, the boundaries of sequence 206 (FIG. 2) and/or sequence 208 (FIG. 2) may be detected based on information received from ACQ unit 174.

In some demonstrative embodiments, ACQ unit 174 may be configured to generate an indication ("detect position") of a detected beginning of each sequence of STF 202 (FIG. 2). For example, ACQ unit 174 may generate a first detect position indication at a detected beginning of a first Golay sequence of STF 202 (FIG. 2), a second detect position indication at a detected beginning of a second Golay sequence of STF 202 (FIG. 2), and so on, e.g., until generating a detect position indication at a detected beginning of sequence 206 (FIG. 2), and a subsequent detect position indication at a detected beginning of sequence 208 (FIG. 2).

In some demonstrative embodiments, ACQ unit 174 may be configured to generate an indication ("sync position") of a detected end of STF 202 (FIG. 2).

In some demonstrative embodiments, the detected position indications may be offset from an actual timing of a beginning of sequence 206 (FIG. 2) and/or beginning of sequence 208 (FIG. 2), and/or the sync position indication may be offset from an actual timing of an actual end of STF 202 (FIG. 2), e.g., due to one or more timing offset errors.

Accordingly, a plurality of samples, which are sampled between the detected position indicator corresponding to sequence 206 (FIG. 2), and the sync position indicator corresponding to the end of STF 202 (FIG. 2), may be offset with respect to sequences 206 (FIG. 2) and 208 (FIG. 2).

For example, a negative timing offset error between the detected position indicators and the beginning of the sequences of STF 202 (FIG. 2) may result in the plurality of samples including samples of some values of a sequence immediately preceding sequence 206 (FIG. 2), followed by samples of the values of sequence 206 (FIG. 2), and followed by samples of only some values of sequence 208 (FIG. 2).

Conversely, a positive timing offset error between the detected position indicators and the beginning of the sequences of STF 202 (FIG. 2) may result in the plurality of samples including samples of only some values of sequence 206 (FIG. 2), followed by samples of the values of sequence 208 (FIG. 2), and followed by samples of some values of sequence 210 (FIG. 2).

In some demonstrative embodiments, the mean value of the plurality of samples corresponding to sequences 206 and 208 (FIG. 2) may depend on the magnitude and direction of the timing offset errors. For example, the mean value of the plurality of values may be different from zero, e.g., if the plurality of samples is offset with respect to sequences 206 and 208 (FIG. 2), for example, if the plurality of samples does not include only pairs of inverse values, which may "cancel" each other out.

Accordingly, the DC estimation, if based on the mean of the plurality of samples, may have an error, which may depend on the magnitude and direction of the timing offset errors.

Figure 3:
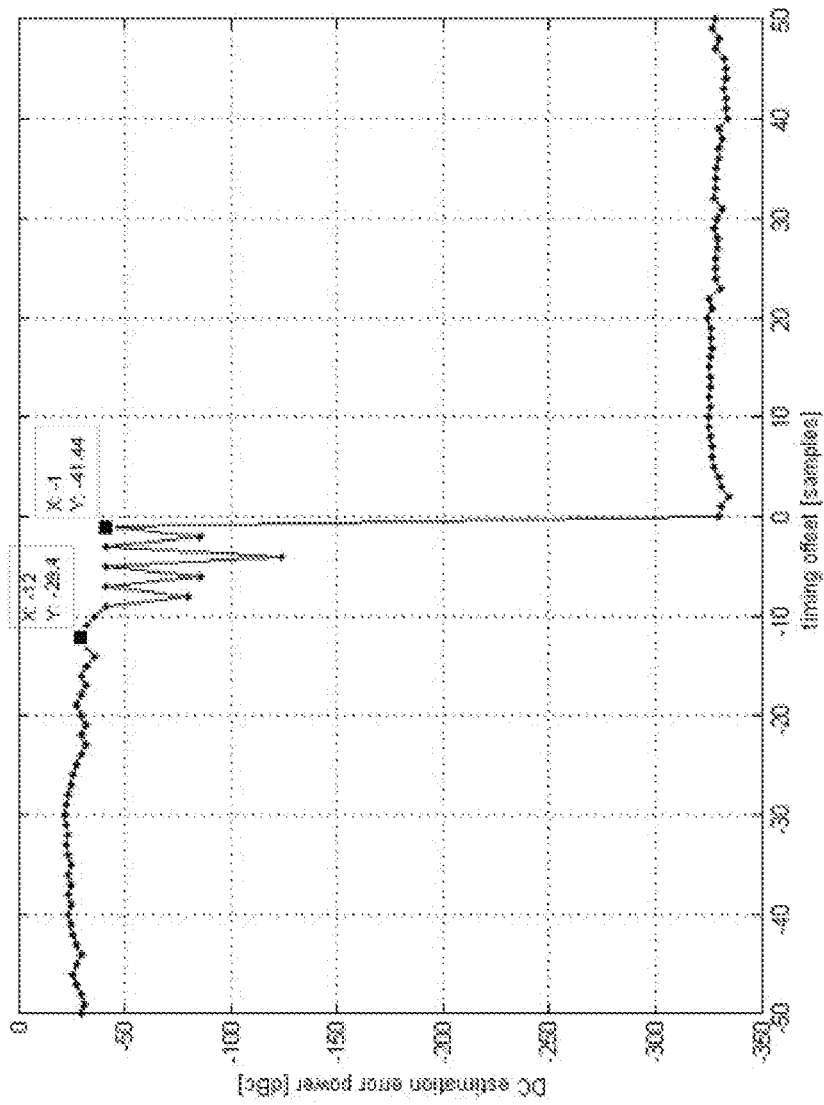
FIG. 3 is a schematic illustration of a graph depicting a Direct Current (DC) estimation error versus a timing offset, in accordance with some demonstrative embodiments.

Reference is now made to FIG. 3, which schematically illustrates a graph depicting a DC estimation error versus a timing offset, in accordance with some demonstrative embodiments. In one example, the DC estimation error depicted by FIG. 3 may correspond to an error of a DC estimation, which is based on the first and second pluralities of samples corresponding to sequences 206 and 208 (FIG. 2), and the timing offset depicted by FIG. 3 may represent a timing offset of the detected position indicators, e.g., provided by ACQ unit 174 (FIG. 1).

As shown in FIG. 3, a negative timing offset may result in an increased DC estimation error, while a positive timing offset may result in substantially no change in the DC estimation error, e.g., compared to a DC estimation error at a zero timing offset.

In some demonstrative embodiments, the zero timing offset may result in the DC estimation being determined based on the first plurality of samples including only samples of values of sequence 206 (FIG. 2) and the second plurality of samples including only samples of values of sequence 208 (FIG. 2).

In some demonstrative embodiments, the positive time offset may result in the DC estimation being determined based on the first plurality of samples including samples of a portion 214 (FIG. 2) of STF 202 (FIG. 2) and the second plurality of samples including samples of a portion 216 (FIG. 2) of STF 202 (FIG. 2), subsequent to portion 214 (FIG. 2).

In some demonstrative embodiments, the positive timing offset may be assumed to be no longer than a duration of portion 212 (FIG. 2), e.g., no longer than the duration of the 64 first values of the Golay sequence $Ga_{128}$ of sequence 206 (FIG. 2).

Accordingly, portion 214 (FIG. 2) may include one or more consecutive values 230 of an end of portion 212 (FIG. 2), followed by values of sequence 206 (FIG. 2) subsequent to portion 212 (FIG. 2), and followed by one or more consecutive values 232 of a beginning of portion 218 (FIG. 2). Similarly, portion 216 (FIG. 2) may include one or more consecutive values 234 of an end of portion 218 (FIG. 2), followed by values of sequence 208 (FIG. 2) subsequent to portion 218 (FIG. 2), and followed by one or more consecutive values 236 of a beginning of portion 220 (FIG. 2). Values 230, 232, 234 and 236 may include the same number of values.

In some demonstrative embodiments, values 236 (FIG. 2) may include the inverse of values 232 (FIG. 2), e.g., as described above. Accordingly, a section including portions 214 (FIG. 2) and 216 (FIG. 2) may have an average zero-mean value. Therefore, the DC estimation error may not be affected by the positive timing offset, for example, as long as the positive timing offset is no not greater than the duration of portion 212 (FIG. 2).

Referring back to FIG. 1, in some demonstrative embodiments, DC estimator 168 may utilize a predefined positive timing offset, e.g., to increase a probability that the DC estimation is being determined based on the first plurality of samples including samples of portion 214 (FIG. 2) and the second plurality of samples including samples of portion 216 (FIG. 2), e.g., even if the timing offset is negative.

In one example, DC estimator 168 may select the first and second pluralities of samples to be positively offset by a predefined number of samples from the detect position indication. For example, if portion 212 (FIG. 2) includes 64 values, as described above, then utilizing a positive offset of 30 samples may enable a timing offset error with a tolerance of [−30, +33] samples.

In some demonstrative embodiments, there may be a frequency offset between portions 214 (FIG. 2) and 216 (FIG. 2). This frequency offset may result in a rotation of portion 216 (FIG. 2) relative to portion 214 (FIG. 2).

In some demonstrative embodiments, DC estimator 168 may determine the first value including a mean, denoted $m_1$, of the first plurality of samples, e.g., corresponding to portion 214 (FIG. 2), and the second value including a mean, denoted $m_2$, of the second plurality of samples, e.g., corresponding to portion 216 (FIG. 2).

In some demonstrative embodiments, DC estimator 168 may determine the DC component of the wireless communication packet based on the mean values $m_1$ and $m_2$, and an estimated frequency offset, denoted θ, between portions 214 and 216 (FIG. 2). The estimated frequency offset θ may be received, for example, from ACQ unit 174 (FIG. 1).

In some demonstrative embodiments, DC estimator 168 may determine the DC component of the wireless communication packet based on a sum of the mean values $m_1$ and $m_2$, a difference between values $m_1$ and $m_2$, and the estimated frequency offset θ, e.g., as described below. In other embodiments, DC estimator 168 may determine the DC component of the wireless communication packet based on any other combination of the mean values $m_1$ and $m_2$, and/or the estimated frequency offset θ.

In some demonstrative embodiments, the mean value $m_1$ may represent a combination of a DC component, denoted dc, of the wireless communication packet; a mean, denoted $dc_s$, of the values of the sequence 206 (FIG. 2), e.g., a mean of the Golay sequence $Ga_{128}$; and a noise component, denoted $v_1$. The mean value $m_2$ may represent a combination of the DC component dc; the mean $dc_s$; the estimated frequency offset θ; and a noise component, denoted $v_2$. For example, the mean values $m_1$ and $m_2$ may be represented as follows:

$$m_1 = dc + dc_s + v_1 \quad (1)$$

$$m_2 = dc - dc_s e^{j\theta} + v_2 \quad (2)$$

In some demonstrative embodiments, the DC component of the wireless communication packet may be estimated based on the mean values $m_1$ and $m_2$ of Equations 1 and 2. For example, the estimated DC component, denoted $dc_{est}$, may be estimated by combining and rearranging Equations 1 and 2, e.g., as follows:

$$dc_{est} = \frac{m_1 + m_2 e^{-j\theta}}{1 + e^{-j\theta}} = \frac{e^{-j\frac{\theta}{2}}\left(m_1 e^{+j\frac{\theta}{2}} + m_2 e^{-j\frac{\theta}{2}}\right)}{e^{-j\frac{\theta}{2}}\left(e^{+j\frac{\theta}{2}} + e^{-j\frac{\theta}{2}}\right)} = \frac{1}{2} \cdot \left[(m_1 + m_2) + j(m_1 - m_2)\tan\left(\frac{\theta}{2}\right)\right] \quad (3)$$

In some demonstrative embodiments, DC estimator 168 may determine the mean values $m_1$ and $m_2$ by calculating the means of the first and second pluralities of samples corresponding to portions 214 and 216 (FIG. 2). DC estimator 168 may also receive the estimated frequency offset θ, e.g., from ACQ unit 174 (FIG. 1).

In some demonstrative embodiments, DC estimator 168 may determine the estimated DC component of the wireless communication packet according to Equation 3. Equation 3 may have low computational complexity, which may require summation operations and a real multiplication operation.

In some demonstrative embodiments, the received wireless communication packet may also be subject to phase noise, which may result in a phase rotation. However, it may be assumed that the estimation of the DC component is not substantially affected by the phase noise, e.g., since the phase noise may be relatively highly correlated over the number of samples included in each of the first and second pluralities of samples, e.g., 128 samples, and/or the mean $dc_s$ may be relatively weak.

In some demonstrative embodiments, DC estimator 168 may utilize a predefined buffering scheme for buffering the first and second values corresponding to the first and second pluralities of samples. The buffering scheme may be configured to reduce delay and/or reduce buffer size, e.g., as described below. In other embodiments, any other buffering scheme may be utilized.

In some demonstrative embodiments, DC estimator 168 may include first and second buffers 169 to buffer first and second mean values, respectively. For example, buffers 169 may include First in First out (FIFO) buffers. In one example, a first buffer 169 may buffer a mean value of a first plurality of samples, including a predefined number of samples, which are sampled upon receiving a detect position indication; and a second buffer 169 may buffer a mean value of a second plurality of samples, including the predefined number of samples, which are sampled upon an immediately subsequent detect position indication. According to this buffering scheme, the first and second buffers 169 may include the mean values of samples corresponding two successive most recently sampled sequences of STF 202 (FIG. 2). Accordingly, the first and second buffers 169 may include mean values corresponding to sequences 206 and 208 (FIG. 2), respectively, when the sync position indication is received.

Figure 4:
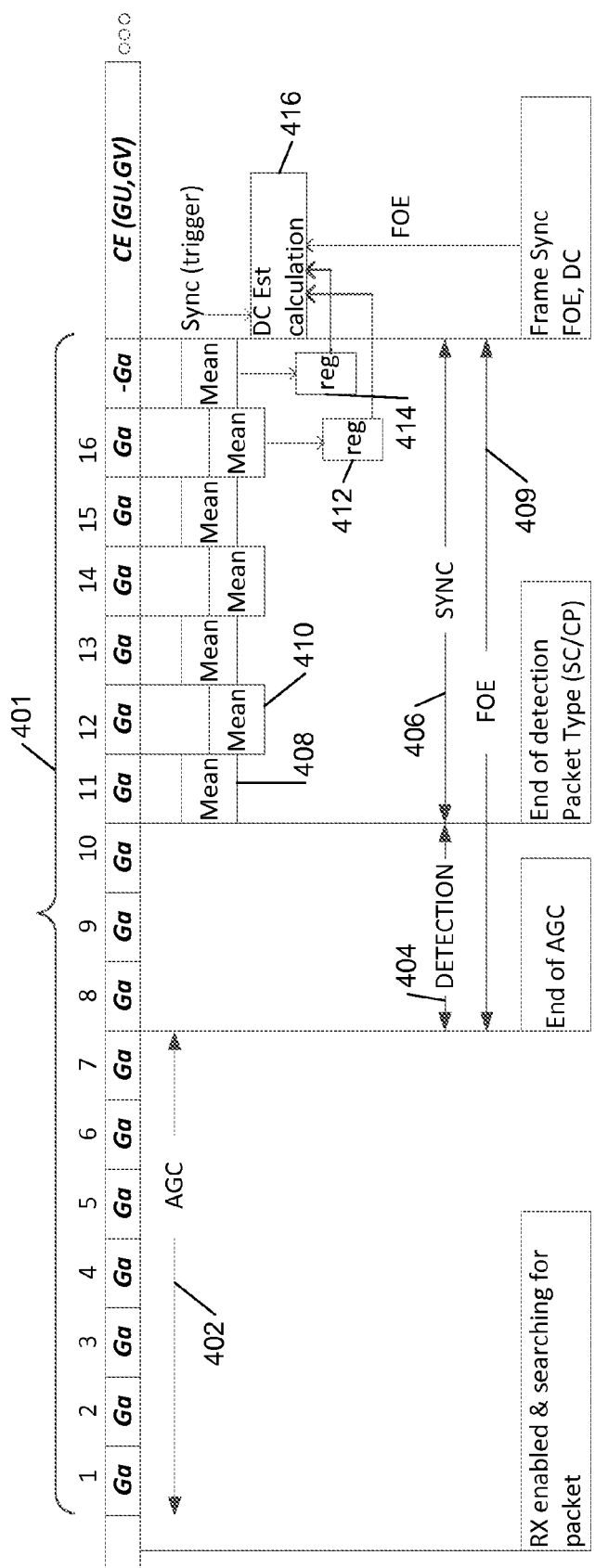
FIG. 4 is a schematic timing illustration of DC estimation, in accordance with some demonstrative embodiments.

Reference is made to FIG. 4, which schematically illustrates a timing of DC estimation, in accordance with some demonstrative embodiments. In some demonstrative embodiments, one or more elements of system 100 (FIG. 1), e.g., DC estimator 168 (FIG. 1) and/or ACQ unit 174 (FIG. 1), may perform one or more operations according to the timeline of FIG. 4.

In some demonstrative embodiments, one or more operations may be performed with respect to one or more sequences at the beginning of an STF 401 of a received wireless communication packet. For example, STF 401 may have a structure similar to STF 202 (FIG. 2). For example, an Automatic Gain Control (AGC) operation may be performed during an AGC phase 402, e.g., based on a plurality of Golay sequences at the beginning of STF 401.

In some demonstrative embodiments, a detection phase 404 may be performed subsequent to AGC phase 402. For example, ACQ unit 174 (FIG. 1) may detect the beginning of the Golay sequences of STF 401.

In some demonstrative embodiments, DC estimator 168 (FIG. 1) may calculate a first mean value 408 and a second mean value 410 of samples corresponding a pair of first and second subsequent sequences of STF 401, and may store the mean values 408 and 410 in a pair of registers 412 and 414, e.g., as described above.

In some demonstrative embodiments, registers 412 and 414 may include the mean values $m_1$ and $m_2$ corresponding to sequences 206 and 208 (FIG. 2), e.g., upon completion of a synchronization phase 406.

In some demonstrative embodiments, a Frequency Offset Estimation (FOE) 409 may be performed, e.g., by ACQ unit 174 (FIG. 1), to estimate the frequency offset based on STF 401.

In some demonstrative embodiments, DC estimation 416 may be performed base on the mean values $m_1$ and $m_2$ stored by registers 412 and 414, when the sync position indication is received. For example, DC estimator 168 (FIG. 1) may estimate the DC component of the wireless communication packet according to Equation 3.

Figure 5:
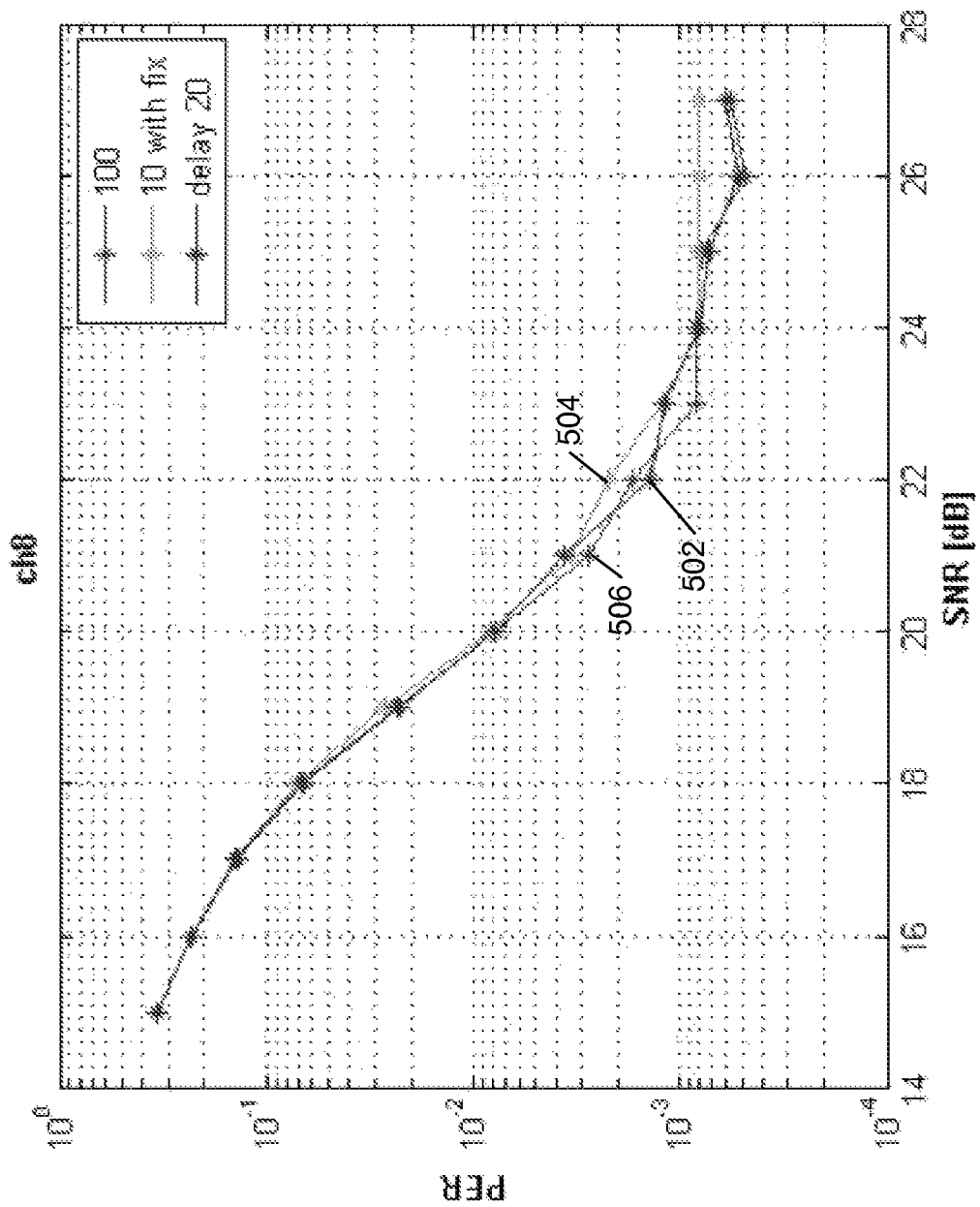
FIG. 5 is a schematic illustration of graphs depicting a Packet Error Rate (PER) versus Signal to Noise Ratio (SNR) with respect to three different DC simulation scenarios, in accordance with some demonstrative embodiments.

FIG. 5 is a schematic illustration of three graphs depicting a Packet Error Rate (PER) versus Signal to Noise Ratio (SNR) with respect to three DC simulation scenarios, in accordance with some demonstrative embodiments.

For example, a first graph 502 may correspond to a DC of −100 decibels relative to the carrier (dBc), a second graph 504 may correspond to a DC of −10 dBc without timing offset and without applying a timing shift to the samples, and a third graph 506 may correspond to a DC of −10 dBc with a random timing offset and with a timing shift of 30 samples, e.g., as described above.

As shown in FIG. 5, there may be negligible differences between graphs 502, 504 and 506. This similarity between graphs 502, 504 and 506 may indicate that a relatively high level of accuracy, e.g., less than −30 dBc, may be achieved with respect to the estimation of the DC component, e.g., as described above.

As also shown in FIG. 5, applying the timing offset of 30 samples may successfully mitigate preamble timing location errors.

Reference is made to FIG. 6, which schematically illustrates a method of DC estimation, in accordance with some demonstrative embodiments. In some embodiments, one or more of the operations of the method of FIG. 6 may be performed by a wireless communication system e.g., system 100 (FIG. 1); a wireless communication device, e.g., devices 102 and/or 130 (FIG. 1); a wireless communication unit, e.g., wireless communication units 104 and/or 132 (FIG. 1); and/or a DC estimator, e.g., DC estimator 168 (FIG. 1).

As indicated at block 602, the method may include determining a first value based on a first plurality of samples including at least a plurality of samples of a first sequence of a preamble of a wireless communication packet. For example, DC estimator 168 (FIG. 1) may determine the mean value $m_1$ based on a first plurality of samples corresponding to sequence 206 (FIG. 2), e.g., as described above.

As indicated at block 604, the method may include determining a second value based on a second plurality of samples including at least a plurality of samples of a second sequence, immediately successive to the first sequence. For example, DC estimator 168 (FIG. 1) may determine the mean value $m_2$ based on a second plurality of samples corresponding to sequence 208 (FIG. 2), e.g., as described above.

As indicated at block 606, the method may include offsetting the first and second pluralities of samples with respect to a detected beginning of the first and second sequences. For example, DC estimator 168 (FIG. 1) may offset the first and second pluralities of samples with respect to a detected beginning of sequences 206 and 208 (FIG. 1), for example, such that the first and second pluralities of samples include samples of portions 214 and 216 (FIG. 2), e.g., as described above.

As indicated at block 608, the method may include estimating a frequency offset between the first and second sequences. For example, ACQ unit 174 (FIG. 1) may estimate the frequency offset θ, e.g., as described above.

As indicated at block 610, the method may include estimating a DC component corresponding to the wireless communication signal based on the first and second values and the estimated frequency offset. For example, DC estimator 168 may estimate the DC component of the received wireless communication signal based on the mean values $m_1$ and $m_2$ and the frequency offset θ, for example, according to Equation 3, e.g., as described above.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of device 102 (FIG. 1), device 130 (FIG. 1), wireless communication unit 104 (FIG. 1), wireless communication unit 132 (FIG. 1), DC estimator 168 (FIG. 1), and/or to perform one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matla, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. An apparatus comprising:
   an Analog to Digital Converter (ADC) to convert analog signals of a received wireless communication packet into at least a first plurality of samples and a second plurality of samples, the first plurality of samples including at least a plurality of samples of a first sequence of a preamble of said wireless communication packet, and the second plurality of samples including at least a plurality of samples of a second sequence of the preamble, immediately successive to said first sequence; and
   a direct current (DC) estimator to estimate a DC component of the received wireless communication packet based on a first mean value, a second mean value and an estimated frequency offset, wherein the first mean value comprises a mean of said first plurality of samples, the second mean value comprises a mean of the second plurality of samples, and the estimated frequency offset corresponds to a frequency offset between said first and second pluralities of samples, said DC estimator is to estimate said DC component based on a sum of said first and second mean values, a difference between said first and second mean values, and said estimated frequency offset.

2. The apparatus of claim 1, wherein said second sequence is an inverse of said first sequence.

3. The apparatus of claim 1, wherein said first plurality of samples is positively offset from a detected beginning of said first sequence, and wherein said second plurality of samples is positively offset from a detected beginning of said second sequence.

4. The apparatus of claim 3, wherein said first plurality of samples includes samples of a first plurality of values of said first sequence and samples of a second plurality of values of said second sequence, and wherein said second plurality of samples includes samples of a third plurality of values of said second sequence and samples of a fourth plurality of values of a third sequence of said preamble, immediately successive to said second sequence.

5. The apparatus of claim 4, wherein said fourth plurality of values includes an inverse of said second plurality of values.

6. The apparatus of claim 1, wherein the first and second sequences include Golay sequences.

7. The apparatus of claim 6, wherein said first sequence includes the Golay sequence $Ga_{128}$, and wherein the second sequence includes the Golay sequence $-Ga_{128}$.

8. The apparatus of claim 1, wherein the first sequence includes a second to last sequence of a Short training Field (STF) of said preamble, and wherein the second sequence includes a last sequence of the STF field.

9. A system comprising:
a wireless communication device including:
one or more antennas to receive a wireless communication packet; and
a direct current (DC) estimator to estimate a DC component of the wireless communication packet based on a first mean value, a second mean value and an estimated frequency offset, wherein the first mean value comprises a mean of a first plurality of samples including at least a plurality of samples of a first sequence of a preamble of said wireless communication packet, the second mean value comprises a mean of a second plurality of samples including at least a plurality of samples of a second sequence of the preamble, immediately successive to said first sequence, and the estimated frequency offset corresponding to a frequency offset between said first and second pluralities of samples, said DC estimator is to estimate said DC component based on a sum of said first and second mean values, a difference between said first and second mean values, and said estimated frequency offset.

10. The system of claim 9, wherein said wireless communication device comprises first and second registers to store said first and second mean values.

11. The system of claim 9, wherein said second sequence is an inverse of said first sequence.

12. The system of claim 9, wherein said wireless communication device comprises an Acquisition (ACQ) unit to estimate said frequency offset, and to detect a beginning of said first and second sequences,
and wherein said first plurality of samples is positively offset from the detected beginning of said first sequence, and said second plurality of samples is positively offset from the detected beginning of said second sequence.

13. The system of claim 12, wherein said first plurality of samples includes samples of a first plurality of values of said first sequence and samples of a second plurality of values of said second sequence, wherein said second plurality of samples includes samples of a third plurality of values of said second sequence and samples of a fourth plurality of values of a third sequence of said preamble, immediately successive to said second sequence, and wherein said fourth plurality of values includes an inverse of said second plurality of values.

14. The system of claim 9, wherein the first and second sequences include Golay sequences.

15. The system of claim 9, wherein the first sequence includes a second to last sequence of a Short training Field (STF) of said preamble, and wherein the second sequence includes a last sequence of the STF field.

16. A method comprising:
estimating a direct current (DC) component of a received wireless communication packet based on a first mean value, a second mean value and an estimated frequency offset, wherein the first mean value comprises a mean of a first plurality of samples including at least a plurality of samples of a first sequence of a preamble of said wireless communication packet, the second mean value comprises a mean of a second plurality of samples including at least a plurality of samples of a second sequence of the preamble, immediately successive to said first sequence, and the estimated frequency offset corresponding to a frequency offset between said first and second pluralities of samples, wherein estimating said DC component comprises estimating said DC component based on a sum of said first and second mean values, a difference between said first and second mean values, and said estimated frequency offset.

17. The method of claim 16, wherein said second sequence is an inverse of said first sequence.

18. The method of claim 16, wherein the first and second sequences comprise Golay sequences.

19. The method of claim 16 comprising positively offsetting said first plurality of samples from a detected beginning of said first sequence, and positively offsetting said second plurality of samples from a detected beginning of said second sequence.

20. The method of claim 19, wherein said first plurality of samples includes samples of a first plurality of values of said first sequence and samples of a second plurality of values of said second sequence, and wherein said second plurality of samples includes samples of a third plurality of values of said second sequence and samples of a fourth plurality of values of a third sequence of said preamble, immediately successive to said second sequence.

21. The method of claim 16, wherein the first sequence includes a second to last sequence of a Short training Field (STF) of said preamble, and wherein the second sequence includes a last sequence of the STF field.

22. A product including a non-transitory storage medium having stored thereon instructions that, when executed by a machine, result in:
estimating a direct current (DC) component of a received wireless communication packet based on a first mean value, a second mean value and an estimated frequency offset, wherein the first mean value comprises a mean of a first plurality of samples including at least a plurality of samples of a first sequence of a preamble of said wireless communication packet, the second mean value comprises a mean of a second plurality of samples including at least a plurality of samples of a second sequence of the preamble, immediately successive to said first sequence, and the estimated frequency offset corresponding to a frequency offset between said first and second pluralities of samples, wherein estimating said DC component comprises estimating said DC component based on a sum of said first and second mean values, a difference between said first and second mean values, and said estimated frequency offset.

23. The product of claim 22, wherein said second sequence is an inverse of said first sequence.

24. The product of claim 22, wherein the first and second sequences comprise Golay sequences.

25. The product of claim 22, wherein said instructions result in positively offsetting said first plurality of samples from a detected beginning of said first sequence, and positively offsetting said second plurality of samples from a detected beginning of said second sequence.

26. The product of claim 25, wherein said first plurality of samples includes samples of a first plurality of values of said first sequence and samples of a second plurality of values of said second sequence, and wherein said second plurality of samples includes samples of a third plurality of values of said second sequence and samples of a fourth plurality of values of a third sequence of said preamble, immediately successive to said second sequence.

\* \* \* \* \*